United States Patent
Cooper

[19]

[11] Patent Number: 5,769,481
[45] Date of Patent: Jun. 23, 1998

[54] INTERLOCK MECHANISM FOR VEHICLE SLIDING DOOR AND FUEL FILLER DOOR

[75] Inventor: Geoffrey John Cooper, Canton, Mich.

[73] Assignee: Ford Global Technologies, Inc., Dearborn, Mich.

[21] Appl. No.: 686,784

[22] Filed: Jul. 26, 1996

[51] Int. Cl.⁶ .................................................... B62D 25/00
[52] U.S. Cl. ........................................ 296/97.22; 296/155
[58] Field of Search ............................... 296/155, 97.22; 292/207, 198

[56] References Cited

U.S. PATENT DOCUMENTS

| | | | |
|---|---|---|---|
| 3,788,685 | 1/1974 | Leichtl | 296/65 A |
| 3,912,311 | 10/1975 | Carvell et al. | 292/216 |
| 4,620,744 | 11/1986 | Yui et al. | 296/155 |
| 5,454,618 | 10/1995 | Sullivan | 296/97.22 |
| 5,520,431 | 5/1996 | Kapes et al. | 296/97.22 |

FOREIGN PATENT DOCUMENTS 0 102 481  7/1983  European Pat. Off. .
0 531 179 A1  7/1992  France .
59-11918  7/1982  Japan .

*Primary Examiner*—Gary C. Hoge
*Attorney, Agent, or Firm*—David B. Kelley

[57] ABSTRACT

An interlock mechanism for a vehicle having a sliding door and a fuel filler door on the same side of the vehicle has three positions: a first, neutral position in which either the sliding door or the filler door can be opened, a second position in which the sliding door is open and the filler door is prevented from opening, and a third position in which the filler door is open and the sliding is prevented from opening. The interlock mechanism has a sliding door latch, a filler door latch, and a cable between the two. The sliding door latch has a striker on a rear edge of the sliding door to interact with a cam which locks the filler door closed when the sliding door is moved to an open position and allows the filler door to open when the sliding door is in a closed position. The cable is connected to the filler door latch and is prevented from movement by the cam when the sliding door is open, but is allowed to moves when the sliding door is shut. When the filler door is opened, the filler door latch pulls the cable which move a pin to a position preventing the cam from rotating and thus stopping the sliding door from opening.

11 Claims, 2 Drawing Sheets

5,769,481

INTERLOCK MECHANISM FOR VEHICLE SLIDING DOOR AND FUEL FILLER DOOR

FIELD OF THE INVENTION

The present invention relates to door interlock mechanisms in general, and more specifically to an interlock mechanism for a vehicle sliding door and fuel filler door.

BACKGROUND OF THE INVENTION

A design option for vehicles with sliding doors, particularly vans, positions a sliding door on the same side of the vehicle as the fuel filler pipe access lid. Such a design raises the possibility of a collision between the sliding door and the filler pipe access lid if the access lid is open for refueling and the sliding door is subsequently opened. Two mechanisms to obviate this potentiality, based on sliding door track lockout mechanisms, were disclosed in U.S. Pat. No. 5,454,618 (Sullivan) and patent application Ser. No. 08/368,946, both assigned to the assignee of the present application and incorporated by reference herein. These door track lockout mechanisms operate by having a stop member and a link, respectively, mounted for alternate movement into and out of a door track to obstruct and unobstruct movement of the sliding door rollers therethrough.

Other mechanisms for preventing an undesirable collision between a door and a fuel filler access lid are shown in Japanese patent 103,511 and U.S. Pat. No. 4,620,744 (Yui, et al.). A drawback of the former approach is that the door will cause chipping, nicking, and denting of the access lid upon collision therewith thus degrading vehicle external appearance. The latter mechanism requires opening the fuel filler lid and then pulling a lever to lock-out the sliding door, an inconvenient extra step. In addition, the mechanism only allows the door to open a short way and also requires many parts which increase both manufacturing expense and assembly time.

SUMMARY OF THE INVENTION

The present invention advances the field and overcomes the disadvantages of the related art by providing an interlock mechanism, for an automotive vehicle having a fuel filler door and a sliding door on a same side of the vehicle body, which does not depend on a door track stop or link to obstruct movement of a vehicle sliding door within a sliding door track. Lockout of either the sliding door or the filler door is provided when the other is opened, thus ensuring that a collision between the two does not occur. The interlock mechanism has a striker on a rear edge of the sliding door operative to interact with a sliding door latch, which locks the filler door closed when the sliding door is moved to an open position and allows the filler door to open when the sliding door is moved to a closed position. The filler door has a filler door latch for releasably latching the filler door closed when the sliding door is open. The sliding door latch is locked by position indication means operative to communicate the position of the filler door thereto.

In a preferred embodiment, the sliding door latch has a rotatable cam member mounted within the vehicle body adjacent a door interface edge which is movable between a first position with the sliding door in the closed position and a second position with the sliding door in an open position. The cam member has a slot with a circumferential branch and a radial branch, a finger portion extending away from said cam exteriorly from said vehicle body, and a land along an edge of the cam member circumjacent said finger portion. A pin is movable within the slot between a neutral position in which the pin can move into either the circumferential branch or the radial branch, and a locked position in which the pin is moved into the radial branch so as to prevent rotation of the cam member to the first position. The pin is moved via a cable having a first end attached to the filler door latch and a second end attached to a pin plate such that movement of the filler door latch between a latch position and an unlatch position moves the pin between the neutral position and the locked position. The striker preferably extends from a rear edge of the sliding door for interaction with the cam member, and has a lead portion for interaction with the finger portion to rotate the cam member to the second position such that the circumferential branch of the slot rotates around the pin when the sliding door is moved to an open position, and a wedge portion cooperative with the land to return the cam member to the first position when the sliding door is moved to the closed position.

BRIEF DESCRIPTION OF THE DRAWINGS

These and other objects, advantages, and features of the present invention will be apparent to those skilled in the automotive body arts upon reading the following description with reference to the accompanying drawings, in which.

DETAILED DESCRIPTION OF THE PREFERRED EMBODIMENT

Figure 1:
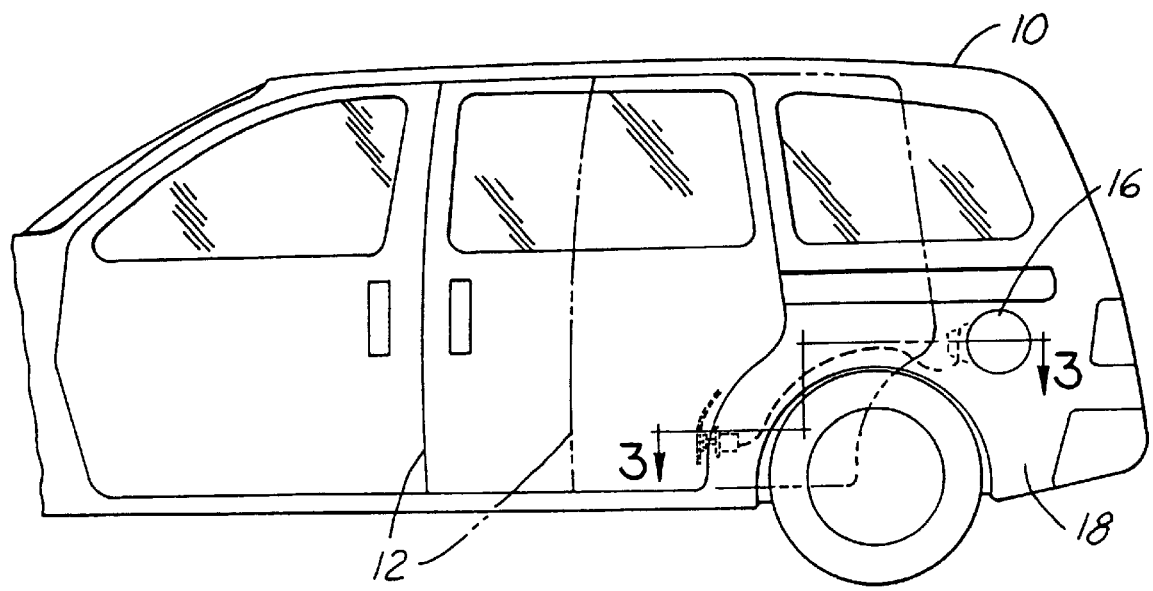
FIG. 1 is a side view of a vehicle body having a sliding door and a fuel filler access lid on the same side of the vehicle body and showing the location of an interlock mechanism according to a preferred embodiment of the present invention.
Figure 2:
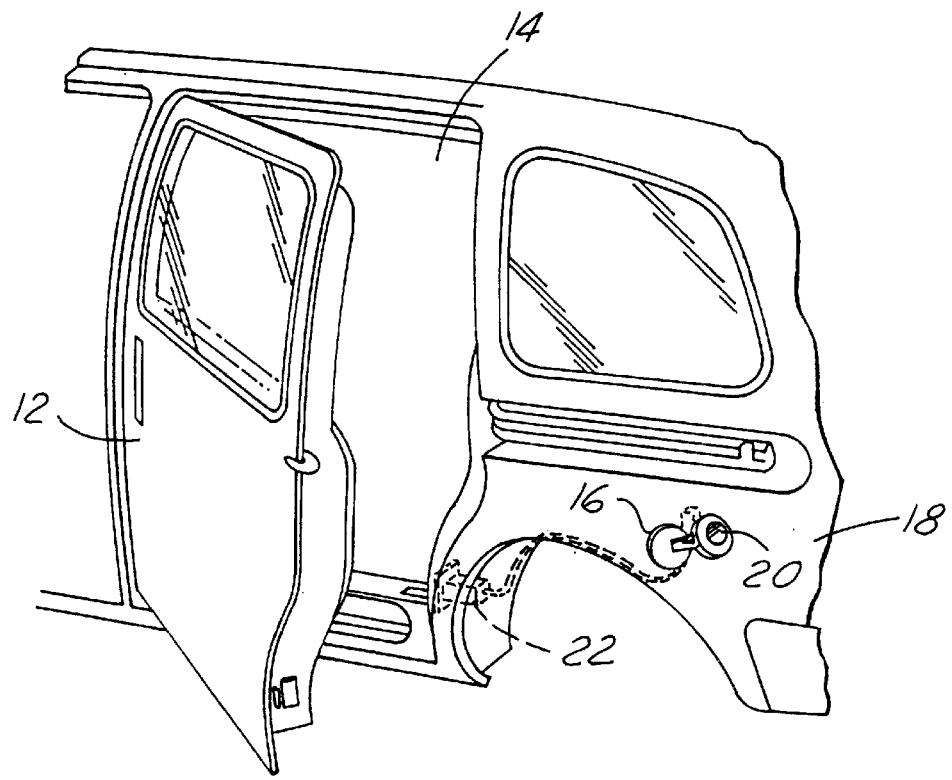
FIG. 2 is a perspective side view of a vehicle access and an adjacent rearward vehicle body section showing the location of an interlock mechanism according to the present invention.

Turning now to the drawings, and in particular to FIG. 1 and FIG. 2 thereof, a vehicle body 10, for example a van, has a sliding door 12 along a side thereof for alternately covering and uncovering a passageway 14 (FIG. 2) to allow entry and egress therefrom. Door 12 assumes an open position when passageway 14 is uncovered, and door 12 assumes a closed position when passageway 14 is covered. A fuel filler door 16 on a rear quarter panel 18 of the body 10 allows access to the filler pipe 20 (FIG. 2) during refueling. If the filler door 16 is opened for refueling and door 12 is in the open position, a collision will occur unless filler door 16 is shut or door 12 is prevented from opening (FIG. 1). Since a fuel pump filler nozzle (not shown) may be in filler pipe 20 when door 12 is opened, it is impractical to shut filler door 16 in such a situation. In addition, if the filler door 16 is opened while the sliding door 12 is open, a collision between the two doors may occur when the sliding door 12 is subsequently shut. The present invention, therefore, provides an interlock mechanism 22 which precludes the opening of either the filler door 16 or the sliding door 12 when the other is open so as to prevent the potentiality of the above described collisions.

Figure 3:
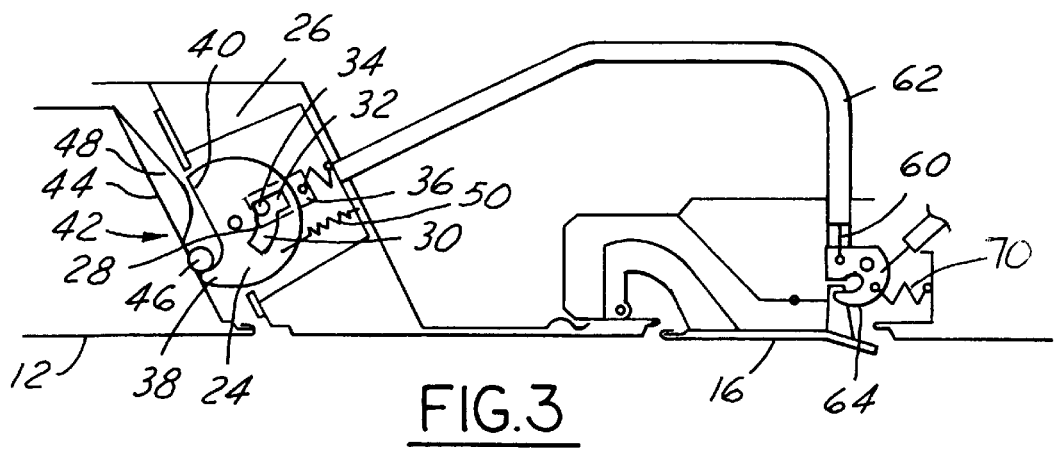
FIG. 3 is a cross-sectional view of an interlock mechanism according to a preferred embodiment of the present invention showing the mechanism in a neutral position in which either the sliding door or the filler door may be open.

A preferred embodiment of the present invention will now be described with reference to FIGS. 3–5. More specifically, FIG. 3 shows the interlock mechanism when both the sliding door 12 and the filler door 16 are closed. The interlock mechanism 22 has a rotatable cam 24 mounted on a door interface edge 26 of the quarter panel 18. The cam 24 has a slot 28 with a circumferential branch 30 and a radial branch 32. A pin 34, which is mounted to a pin plate 36, is movable within the slot 28. From a neutral position depicted in FIG. 3, pin 34 may freely move into either branch of slot 28 as further described below. The cam 24 also includes a finger portion 38 along the outer circumference of cam 24 as well as a land 40 circumjacent the finger portion 38. The cam 24 cooperates with a striker 42 mounted on a rear edge 44 of the sliding door 12. The striker 42 has a lead portion 46 and a wedge portion 48 for interaction with the finger portion 38 and the land 40, respectively. When the sliding door 12 is in the closed position, the wedge portion 48 abuts the land 40 to prevent rotation of the cam 24 under the biasing force of a spring 50. A cable 60 within a cable conduit 62 connects pin plate 36 to a fuel filler door latch 64.

Figure 4:
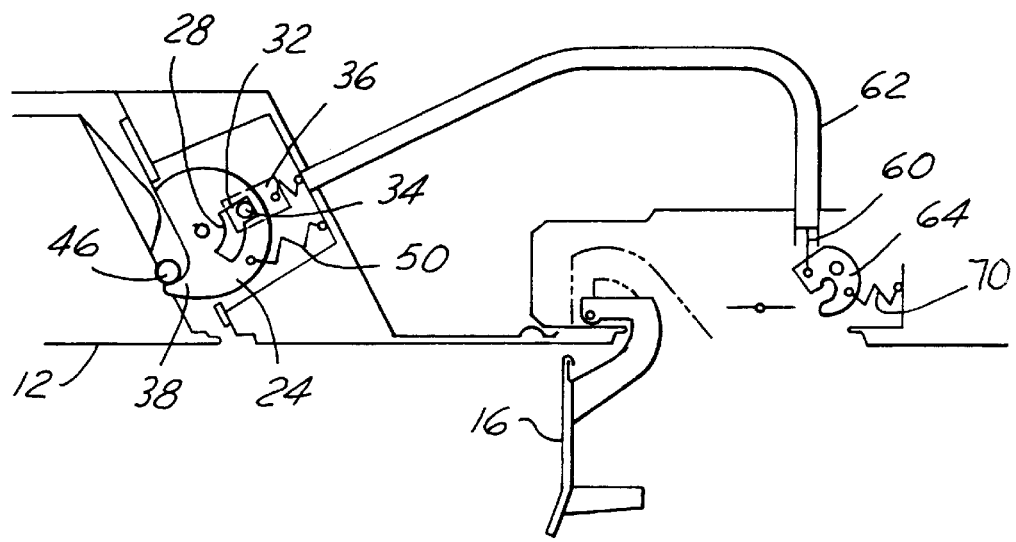
FIG. 4 is a cross-sectional view similar to FIG. 3 but showing the interlock mechanism in a position in which the filler door is open and the sliding door is prevented from opening.

FIG. 4 shows the preferred embodiment of the interlock mechanism in operation, specifically when the filler door 16 is open during refueling. Upon opening the filler door 16, a biasing spring 70 rotates the fuel filler access latch 64. This, in turn, causes movement in cable 60 toward the filler door 16 and away from sliding door 12. In this way, the pin plate 36 moves toward conduit 62, thereby causing the pin 34 to move into the radial branch 32 of the slot 28. Thus, the pin 34 assumes a locked position. Accordingly, the cam 24 is prevented from rotation and the finger portion 38 remains engaged with the lead portion 46. This engagement assures that the sliding door 12 will remain in the closed position as long as filler door 16 is open.

Figure 5:
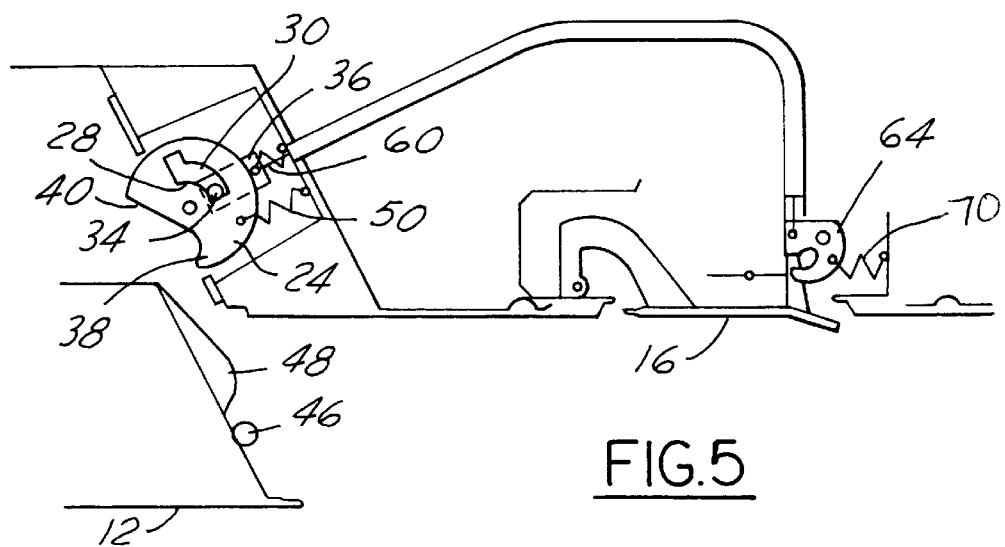
FIG. 5 is a cross-sectional view similar to FIGS. 3 and 4 but showing the interlock mechanism when the sliding door is an open position and the filler door is prevented from opening.

Referring to FIG. 5, the sliding door 12 is shown moved to an open position with the filler door closed. Upon opening the sliding door 12, the urging of biasing spring 50 and the movement of lead portion 46 against finger portion 38 effect the rotation of cam 24, which is no longer abuts the land 40. Consequently, the cam 24 rotates so that the pin 34 resides in the circumferential branch 30 of the slot 28. The pin plate 36 is thus held in place while the sliding door 12 is in the open position. Correspondingly, the cable 60 cannot move to unlatch the latch 64, assuring that the filler door 16 remains closed while the sliding door 12 is in the open position.

When the sliding door 12 is returned to the closed position, the wedge portion 48 pushes against the land 40 to return the cam 24 to the position shown in FIG. 3 with the pin 34 in the neutral position. In this way, the cable 60 is free to move, and the latch 64 can be unlatched to allow the filler door 16 to be opened during subsequent refueling.

Various modifications and variations will no doubt occur to those skilled in the art to which this invention pertains. For example, the latch 64 could be released via a remotely controlled mechanical or electrical actuator (not shown) without affecting the functionality of the present invention. This and all other such variations which rely on the teachings through which this disclosure has advanced the art are properly considered within the scope of this invention.

I claim:

1. An interlock mechanism for an automotive vehicle having a fuel filler door and a sliding door on a same side of a body of said vehicle, the interlock mechanism comprising:

(a) sliding door latch means for releasably latching the sliding door in a closed position when the filler door is open, having:
   (i) a rotatable cam member mounted within the vehicle body adjacent a door interface edge and movable between a first position with the sliding door in the closed position and a second position with the sliding door in an open position, the cam member having:
      a slot having a circumferential branch and a radial branch
      a finger portion extending away from said cam exteriorly from said vehicle body, and
      a land along an edge of the cam member circumjacent said finger portion; and
   (ii) pin means movable within the slot between a neutral position in which the pin means can move into the circumferential branch and the radial branch, and a locked position in which the pin means is moved into the radial branch so as to prevent rotation of the cam member to the first position;
(b) striker means extending from a rear edge of the sliding door for interaction with the cam member, the striker means having a lead portion for interaction with the finger portion to rotate the cam member to the second position such that the circumferential branch of the slot rotates around the pin means when the sliding door is moved to an open position, and a wedge portion cooperative with the land to return the cam member to the first position when the sliding door is moved to the closed position;
(c) filler door latch means for releasably latching the filler door in a closed position when the sliding door is in the open position; and
(d) connection means between the filler door latch means and the sliding door latch means to move the pin means within the slot.

2. An interlock mechanism according to claim 1 wherein the pin means comprises a pin member mounted on a pin plate movable with respect to the cam member.

3. An interlock mechanism according to claim 2 wherein the filler door latch means comprises a pivotable latch movable between a latch position latched to the filler door and an unlatch position unlatched from the filler door.

4. An interlock mechanism according to claim 3 wherein the connection means comprises a cable having a first end attached to the latch and a second end attached to the pin plate such that movement of the latch between the latch position and the unlatch position moves the pin plate between the neutral position and the locked position.

5. An interlock mechanism for an automotive vehicle having a fuel filler door and a sliding door on a same side of a body of said vehicle, the interlock mechanism comprising:

(a) sliding door latch means for releasably latching the sliding door in a closed position when the filler door is open and for allowing the sliding door to move to an open position when the filler door is closed, the sliding door latch means comprising:
   (i) a cam member mounted within the vehicle body adjacent a door interface edge and movable between a first position with the sliding door in the closed position and a second position with the sliding door in an open position;
   (ii) a striker extending from a rear edge of the sliding door for moving the cam member to the second position when the sliding door is moved to an open position, and to the first position when the sliding door is moved to the closed position; and (iii) a cam lock movable between a lock position for preventing movement of the cam member to the second position from the first position when the filler door is open, and a neutral position allowing movement of the cam member between the first and second positions;

(b) a pivotable latch movable between a latch position latched to the filler door and an unlatch position unlatched from the filler door; and (c) cam lock actuation means for actuating the cam lock means to the lock position when the filler door is open.

6. An interlock mechanism according to claim 5 wherein the cam member has:

a slot having a circumferential branch and a radial branch for receiving the cam lock means;

a finger portion extending away from the cam exteriorly from the vehicle body for interaction with the striker when the sliding door is moved from the closed position to the open position; and a land along an edge of the cam member circumjacent the finger portion for interaction with the striker when the sliding door is moved from the open position to the closed position.

7. An interlock mechanism according to claim 6 wherein the cam lock means comprises a pin mounted on a pin plate movable with respect to the cam member, the pin movable within the slot between a neutral position in which the pin can move into the circumferential branch and the radial branch, and a retracted position in which the pin means is moved into the radial branch so as to block movement of the sliding door to the open position.

8. An interlock mechanism according to claim 7 wherein the cam lock actuation means comprises a cable connected on a first end to a pin member mounted on a pin plate movable with respect to the cam member.

9. An interlock mechanism according to claim 8 wherein the cable has a first end attached to the latch and a second end attached to the pin plate such that movement of the latch between the latch position and the unlatch position moves the pin between the neutral position and the locked position.

10. An interlock mechanism for an automotive vehicle having a fuel filler door and a sliding door on a same side of a body of said vehicle, the interlock mechanism comprising:

(a) a rotatable cam assembly mounted within the vehicle body adjacent a door interface edge and movable between a first position with the sliding door in a closed position and a second position with the sliding door in an open position, the cam assembly having:

(i) a slot having a circumferential branch and a radial branch; and (ii) a pin movable within the slot between a neutral position in which the pin can move into the circumferential branch and the radial branch, and a retracted position in which the pin is moved into the radial branch so as to prevent rotation of the cam member to the first position;

(b) a striker on the sliding door operative to interact with the cam assembly for locking the filler door closed when the sliding door is moved to an open position and for allowing the filler door to open when the sliding door is moved to the closed position;

(c) filler door latch means for releasably latching the filler door when the sliding door is open; and (d) position indication means attached to the filler door latch means and the sliding door latch means for indicating the position of the filler door to the sliding door latch means.

11. An interlock mechanism according to claim 10 wherein the striker has a lead portion for interaction with a finger portion extending away from the cam exteriorly from the vehicle body to rotate the cam assembly to the second position such that the circumferential branch of the slot rotates around the pin when the sliding door is moved to the open position, and a wedge portion cooperative with a land alone an edge of the cam assembly circumjacent the finger portion to return the cam assembly to the first position when the sliding door is moved to the closed position.

* * * * *